No. 752,741. PATENTED FEB. 23, 1904.
G. C. WILKINSON.
MOTOR CYCLE.
APPLICATION FILED AUG. 12, 1903.
NO MODEL.

Witnesses
Jas E Hutchinson
Henry Goodall

Inventor
George C. Wilkinson
By Wm. D. Sharby
Attorney

No. 752,741. Patented February 23, 1904.

UNITED STATES PATENT OFFICE.

GEORGE C. WILKINSON, OF PLATTSBURG, NEW YORK.

MOTOR-CYCLE.

SPECIFICATION forming part of Letters Patent No. 752,741, dated February 23, 1904.

Application filed August 12, 1903. Serial No. 169,195. (No model.)

*To all whom it may concern:*

Be it known that I, GEORGE C. WILKINSON, a citizen of the United States, and a resident of Plattsburg, in the county of Clinton and State of New York, have invented a new and useful Motor-Cycle Clutch Mechanism, of which the following is a specification.

My invention relates to motor-vehicles in general, and more particularly to that class of motor-vehicles known as "motor-cycles," in which means, such as pedals, are provided to enable the rider to drive the machine by personal effort. In this latter class of vehicles it often becomes necessary or desirable to shut down the motor, either because the motive fluid has given out, the motor or some part of the motive mechanism is defective, or for any other cause, and to propel the vehicle by means of the pedals. Under such conditions on account of the weight, inertia, and friction of the parts the motor becomes a drag and adds materially to the labor of the rider in propelling the machine.

One of the objects of my invention, therefore, is to provide means to disconnect the motor from the vehicle drive-wheel when the motor is not operating.

A further object is to provide means under the control of the rider seated upon the vehicle to govern the operative connection between the motor and the vehicle drive-wheel.

A further object is to provide a pulley for the motor-shaft and means under control of the rider seated upon the vehicle to convert said pulley either into a fixed or an idler pulley.

A further object is to provide an improved clutch mechanism applicable to motor-cycles.

These and other objects will more fully appear as I proceed with a detailed description of my invention.

In the accompanying drawings I have illustrated my invention, and shall describe it as applied to a motor-cycle of the explosive-engine type; but it will be understood that the invention is capable of many other applications and will be found useful with other types of machines. Also in illustrating the motor-cycle I have omitted many details and parts of apparatus which have no bearing upon my invention, such as oil-tanks and details of engine construction, as these would only serve to confuse the drawings.

Figure 1:
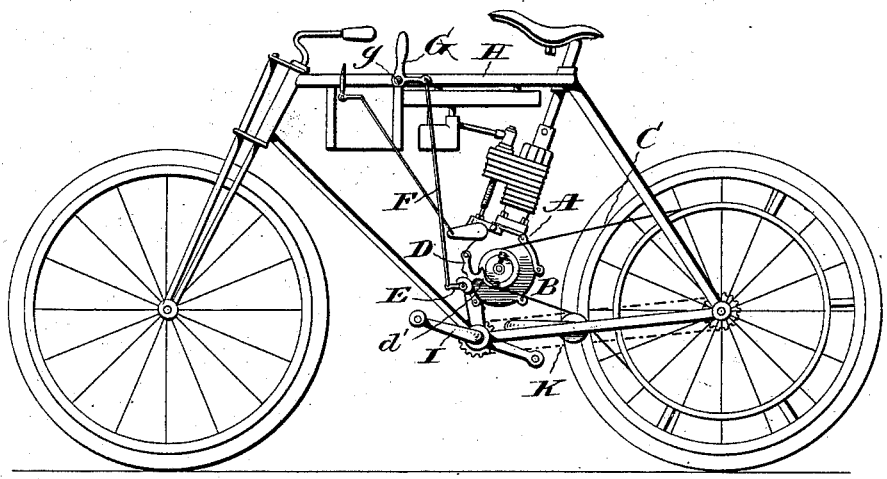
Figure 2:
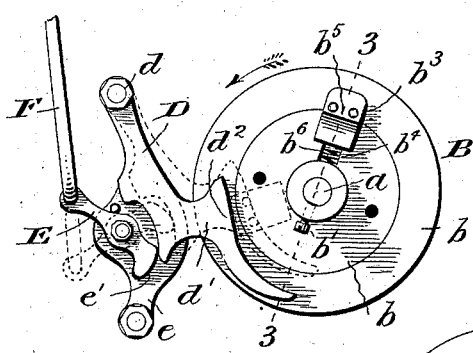
Figure 3:
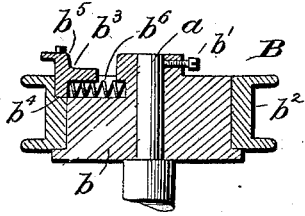
Figure 4:
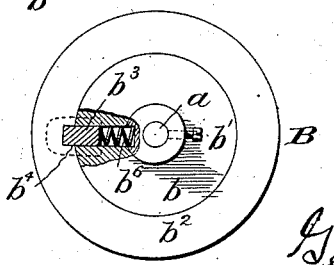

In the drawings, Figure 1 is a view in elevation of a motor-cycle equipped with my invention. Fig. 2 is an enlarged view showing the clutch mechanism. Fig. 3 is a sectional view taken on the line 3 3 of Fig. 2, and Fig. 4 is a detail.

Referring to the drawings, A is a motor (shown as a gasolene-engine) suitably mounted upon the frame of the motor-cycle. Upon the shaft $a$ of the motor is mounted a driving-pulley B, connected with the rear or drive wheel of the cycle by belt C or other suitable gearing. Pulley B, according to the usual practice, has usually been made solid, but according to my construction is composed of two parts—an inner member $b$, adapted to be secured in fixed relation to the motor-shaft $a$ by any suitable means, such as set-screw $b'$, and to revolve with said shaft, and an outer sleeve $b^2$, rotatable upon said inner member and having a suitable peripheral groove to receive belt C. The inner member $b$ has a radially-extending groove in which is mounted a locking-pawl $b^3$, normally pressed outwardly by spring $b^6$ to engage a notch $b^4$ upon the inner surface of sleeve $b^2$ to hold the parts together and form practically a fixed pulley. Locking-pawl $b^3$ has a lug $b^5$ extending beyond its face.

A movable shoe-lever D is pivoted to the motor-casing at $d$ and has a shoe $d'$, provided with a curved surface $d^2$ for contact with lug $b^5$ of locking-pawl $b^3$. E is a cam-lever, pivotally mounted upon a yoke $e$ upon the frame of the motor and provided with a cam-surface $e'$ for engagement with shoe-lever D. The opposite end $e^2$ of the cam-lever E is connected by an operating-rod F to a bell-crank lever G, pivotally mounted at $g$ upon the upper bar of the cycle-frame within easy reach of the rider.

The pedals I of the machine are connected in the usual manner with the drive-wheel by sprocket-chain K.

The operation is as follows: When the engine is running or is to be run, the parts are in the position shown in whole lines in the figures—that is, the locking-pawl $b^3$ engages notch $b^4$, and pulley B therefore revolves as a whole with the engine-shaft in the direction of the arrow, Fig. 2, thus driving the vehicle by belt C. Lever D is in its retracted position, with shoe $d'$ clear of the path of revolution of pawl-lug $b^5$. Now when it is desired to dispense with the motor for a time the motor is stopped or its actuating fluid cut off. Operating-rod F is depressed by means of bell-crank lever G. This moves cam-lever E to bring cam-surface $e'$ in contact with shoe-lever D, thereby forcing shoe $d'$ into the path of revolution of locking-pawl lug $b^5$. Then either from the momentum of the stopping engine or the power exerted by the rider upon the pedal-cranks pulley B revolves until the locking-pawl lug $b^5$ engages the inclined and curved surface $d^2$ of shoe $d'$, the pawl $b^3$ being thereby forced back against the pressure of spring $b^6$ out of engagement with notch $b^4$ in sleeve $b^2$. The motor-belt C will then continue to run upon sleeve $b^2$ as an idler-pulley, and the motor-shaft and inner member $b$ of the pulley B will remain stationary. The rider is thus relieved of the necessity of driving the motor as a dead-weight or drag. This position of the shoe-lever D and cam-lever E is shown in dotted lines in Fig. 2.

Of course many changes in details of construction and modification of parts may be made in the embodiment of my invention above described without departing from the spirit of the invention, and all such changes which are within the scope of the following claims, I wish it to be understood, fall strictly within the scope of the invention.

What I claim as new, and desire to secure by Letters Patent of the United States, is—

1. In a motor-cycle, the combination with a propelling-motor and pedal mechanism, gear connection between said motor and the cycle drive-wheel and between said pedal mechanism and drive-wheel, a clutch device operatively connected in said first-mentioned gear connection and having a radially-movable clutching element, and a governable lever having a shoe portion movable into and out of the path of movement of said clutching element to prevent or allow its clutching action.

2. In a motor-cycle, the combination with a propelling-motor and pedal mechanism, gear connection between said motor and cycle drive-wheel and between said pedal mechanism and drive-wheel, a clutch operatively connected in said first-mentioned gear connection comprising an inner member and an outer sleeve rotatable upon said inner member, a spring-pressed locking-pawl upon said inner member for engagement with said outer sleeve, and a governable lever for contact with said locking-pawl to prevent the engagement of said pawl with said outer sleeve.

3. In a motor-cycle, the combination with a propelling-motor and pedal mechanism, of a pulley comprising an inner member fast to the motor-shaft and an outer sleeve rotatable upon said inner member, a driving connection between said outer sleeve and the cycle drive-wheel, a movable clutching element mounted upon said inner member for engagement with said outer sleeve, a shoe pivotally mounted and having an inclined curved surface for engagement with said clutching element, and means operable by the rider upon the vehicle-seat for moving said shoe into and out of the path of movement of said clutching element.

4. In a motor-cycle, the combination with a propelling-motor and pedal mechanism, of a pulley comprising an inner member fast to the motor-shaft and an outer sleeve rotatable upon said inner member, a driving connection between said outer sleeve and the cycle drive-wheel, a spring-pressed locking-pawl mounted upon said inner member for engagement with said outer sleeve, and governable means in the path of movement of said locking-pawl to prevent its engagement with said outer sleeve.

5. In a motor-cycle, the combination with a propelling-motor and pedal mechanism, of a pulley comprising an inner member fast to the motor-shaft and an outer sleeve rotatable upon said inner member, a driving connection between said outer sleeve and the cycle drive-wheel, a spring-pressed locking-pawl mounted upon said inner member for engagement with said outer sleeve, a shoe pivotally mounted in operative relation to said locking-pawl, and a cam-lever to move said shoe into the path of movement of said locking-pawl.

In testimony whereof I have signed my name to this specification in the presence of two subscribing witnesses.

GEO. C. WILKINSON.

Witnesses:
H. B. NICHOLS,
R. C. WILKINSON.